March 5, 1957   L. J. VAN DE POLDER   2,784,367
CIRCUIT-ARRANGEMENT FOR PRODUCING DIRECT VOLTAGES
Filed Aug. 16, 1952
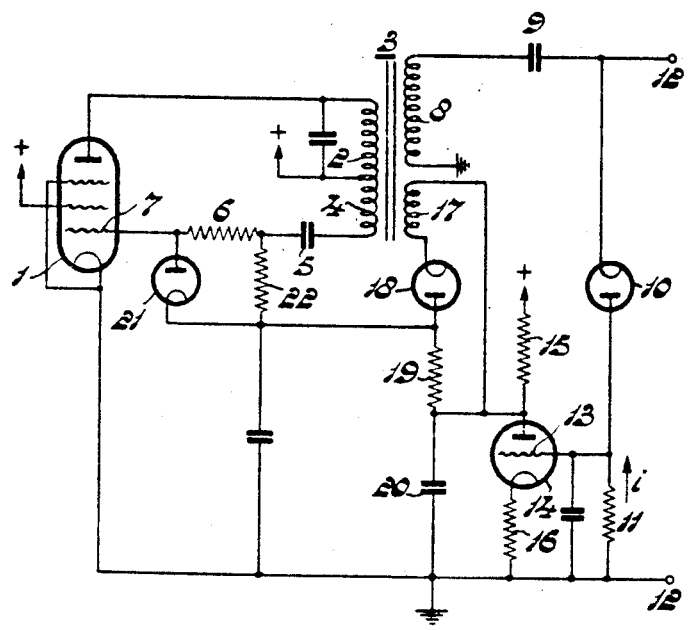
INVENTOR
LEENDERT JOHAN VAN DE POLDER
BY
AGENT

2,784,367

CIRCUIT-ARRANGEMENT FOR PRODUCING DIRECT VOLTAGES

Leendert Johan van de Polder, Eindhoven, Netherlands, assignor to Hartford National Bank and Trust Company, Hartford, Conn., as trustee Application August 16, 1952, Serial No. 304,684

Claims priority, application Netherlands November 20, 1951

3 Claims. (Cl. 321—2)

This invention relates to circuit-arrangements for producing direct voltages, more particularly for supplying cathode-ray tubes, said direct voltages being obtained by rectifying the alternating voltage set up in an output circuit of a generator circuit-arrangement, a load-dependent control voltage being supplied to the generator circuit for maintaining the produced direct voltage substantially constant in the case of load variations.

It is known that for producing a direct voltage for supplying cathode-ray tubes, use is frequently made of a separate generator.

This generator may, for example, consist of an oscillator for producing a sinusoidal alternating voltage of comparatively high frequency, for example 20 to 300 kilocycles per second.

Alternatively, use is often made of an oscillator producing a sawtooth or pulse voltage which is applied to a control electrode of a discharge tube whose output circuit comprises an inductance coil which together with the natural capacity of the coil or with a capacitor connected in parallel with the coil constitutes an oscillatory circuit. By means of the sawtooth or pulse voltage the tube is periodically cut off and voltage pulses are produced across the coil and are rectified.

Unless special precautions are taken, the produced direct voltage varies on the occurrence of load variations in circuit-arrangements of the aforesaid type.

This is particularly troublesome if the load consists of a cathode-ray tube for reproducing television images, since in such tubes the current strength of the electron beam varies as a function of the brightness of the image points to be reproduced.

Therefore, to maintain the produced direct voltage substantially constant despite load variations, the generator circuit is supplied with a control voltage dependent on the load.

When using, for example, an oscillator for producing a sinusoidal alternating voltage, said control voltage may be supplied in known manner to a control grid of a discharge tube of the oscillator with a view to controlling the energy supplied to the oscillatory circuit of the generator.

As an alternative, the frequency of the produced oscillation may be controlled by means of the said control voltage.

When utilizing a discharge tube controlled by a sawtooth or pulse oscillator with the use of an inductance coil in the output circuit, the control voltage can be used in a known manner for controlling the frequency of the saw-tooth or pulse oscillator or for controlling the amplitude or the duration of the voltage produced by the oscillator, or again for controlling the bias of that control grid of the discharge tube, to which the produced sawtooth or pulse voltage is applied.

For producing the control voltage two methods have been proposed. In the first of these methods, the control voltage depends on the value of the produced direct voltage.

This method has the advantage of avoiding instability of the circuit-arrangement, but the disadvantage that the produced direct voltage is not entirely independent of the value of the load.

In the second of these methods, the control voltage depends on the value of the load-current supplied.

This method has the advantage that the direct voltage can be made independent of the value of the load, but is limited in connection with the risk of instability.

The circuit-arrangement according to the present invention is based on the recognition that by combining the aforementioned two methods of producing the control voltage the direct voltage produced is substantially independent of the value of the load and substantially avoids the risk of instability.

The circuit-arrangement according to the present invention has the feature that the control voltage consists of the sum of two control voltages, one of which is determined by the produced direct voltage and the other of which is determined by the load current.

In order that the invention may be readily carried into effect it will now be described in detail with reference to the accompanying drawing, given by way of example, which shows one embodiment of the circuit-arrangement according to the invention.

In the figure, the anode circuit of an electron discharge tube 1 comprises an oscillatory circuit with a coil 2 constituting one of the windings of a transformer 3. The feed back voltage for the tube 1 is taken from a coil 4 of the transformer 3 and is applied by way of a capacitor 5 and a resistor 6 to the control grid 7 of the tube 1.

The alternating voltage produced across coil 2 is stepped up by means of the transformer 3 and the alternating voltage thus produced across coil 8 is supplied to a rectifier circuit comprising a capacitor 9 and a rectifier 10, a resistor 11 being connected in series with rectifier 10.

The direct voltage produced is supplied by way of output terminals 12 to a load (not shown). If a current $i$ passes through the load, it also traverses the resistor 11 in the direction indicated by the arrow in the drawing.

The voltage thus set up across the resistor 11 is applied to control grid 13 of the electron discharge tube 14, whose anode circuit comprises a resistor 15 and whose cathode circuit includes a resistor 16.

The transformer 3 comprises a fourth winding, one end of which is connected to the cathode of a diode 18 and the other end of which is connected to the anode of the tube 14. A resistor 19 is connected between the anodes of the diode 18 and the tube 14, the anode of the tube 14 being further connected to a point at ground potential by way of a capacitor 20.

The anode of the diode 18 is connected by way of a diode 21 to the control grid 7 of the tube 1, said control grid being coupled to the anode of the diode 21. The cathode of the diode 21 is connected by way of a resistor 22 to a point on the line connecting the resistor 6 to the capacitor 5.

If in this circuit-arrangement the load-current $i$ through resistor 11 increases, the potential of the control-grid 13 of the tube 14 becomes more negative, so that the anode voltage of the tube 14 and consequently the voltage across the capacitor 20 increases.

Hence, the voltage set up across the capacitor 20 can be utilized as a control voltage dependent upon the load current. If this voltage is applied directly to the control grid 7 of the tube 1, the potential of said control grid increases with an increase in load current, with the result that more energy is supplied to the oscillatory circuit comprising coil 2. If a considerable control voltage were used, this could involve instability, hence the produced direct voltage would increase and the load current $i$ would further increase due to the larger supply of energy.

In this event, however, the voltage set up across the coil 17 also increases, with the result that the potential of the anode of diode 18 goes more negative relatively to the lower end (in the drawing) of the resistor 19.

Consequently, a voltage-dependent control voltage is set up across the resistor 19 and in the case under consideration said voltage-dependent control voltage counteracts the current-dependent control voltage across the capacitor 20.

If the current-dependent control is weakened, so that despite this control a drop of the produced direct voltage takes place with an increase in load current $i$, the voltage across the coil 17 also drops, with the result that the potential of the anode of the diode 18 becomes less negative relative to the lower end of the resistor 19. In this case, the voltage-dependent control voltage across the resistor 19 aids the action of the current-dependent control voltage through the capacitor 20.

By proper selection of the values of the two control voltages the produced direct voltage is made substantially constant despite the occurrence of load variations. This may be ascribed to the fact that the voltage-dependent control voltage brings about negative feedback in respect to variations of the produced direct voltage, thus aiding in maintaining the stability of the circuit-arrangement.

In initially adjusting the circuit-arrangement care should be taken that at full load, that is, at the occurrence of the maximum value of the load current $i$, the anode of the diode 18 is at ground potential, so that the total control voltage across the resistor 19 and the capacitor 20 is just zero.

At no-load, that is, when no current is taken by the load, the potential of the anode of the diode 18 should drop to a point where it may feed sufficient energy for supplying the desired high voltage to the oscillating circuit comprising the coil 2.

This adjustment is simply effected by a proper selection of the resistors 11, 15 and 16.

The diode 21, in cooperation with the resistors 6 and 22, establishes the positive peak-values of the feedback voltage, which is applied to the control grid 7 from the coil 4, at the potential of the anode of the diode 18. In this manner it is achieved that the potential which is developed at the anode of the diode 18, and which is determined by the value of the combined control voltage across the resistor 19 and the capacitor 20, determines the bias applied to the grid 7 and hence the power supplied to the oscillatory circuit of the generator.

The resistor 6 also insures that the alternating voltage set up at the control grid 7 is not sinusoidal but has flattened positive peaks, which is advantageous in connection with the form of the anode-current of tube 1.

In the circuit-arrangement shown in the figure, the control grid circuit of the tube 1 has no fixed bias supply because the control voltage is either negative or zero due to the fact that the absolute value of the voltage-dependent control voltage across the resistor 19 is chosen larger than the absolute value of the current-dependent control voltage across the capacitor 20.

Apart from the risk of instability, the produced direct voltage is the same at no-load and at full-load, when only current-dependent control is utilized. However, characteristic deviations occur at intermediate values of the load due to non-linearity of the load. When voltage-dependent control is also utilized, however, these deviations are considerably reduced by the then occurring voltage negative feedback.

It is to be understood that the invention is not limited to the details disclosed but includes all such variations and modifications as fall within the spirit of the invention and the scope of the appended claims.

What I claim is:

1. A circuit arrangement for producing a direct voltage for energizing a load circuit, comprising means for producing an oscillatory wave comprising an electron discharge device having a control electrode and transformer means coupled to said electron discharge device, rectifier means coupled to said transformer for rectifying said oscillatory wave, and means for stabilizing the value of the direct voltage produced by said rectifier means, said stabilizing means comprising means for producing a first voltage having a value determined by the value of said produced direct voltage, means for producing a second voltage having a value determined by the value of the current flow to said load circuit, means for combining said first and second voltages thereby to produce a resultant control voltage, and means for applying said control voltage to said control electrode.

2. A circuit arrangement as claimed in claim 1, wherein said means for producing a first voltage having a value determined by the value of said produced direct voltage comprises second rectifier means coupled to said transformer, and said means for producing a second voltage having a value determined by the value of the current flow to said load circuit comprises a resistor connected to said rectifier means to pass the load current, a second electron discharge device having a control electrode, and means for applying the voltage produced across said resistor to the control electrode of said second device.

3. A circuit arrangement as claimed in claim 2, further comprising means for applying a feedback voltage to the control electrode of said first device, a parallel circuit comprising third rectifier means and two additional resistors connected in series across said third rectifier means, means for applying said control voltage to the control electrode of said first device through said parallel circuit, one of said two additional resistors being connected at one end to the control electrode of said first device, and a capacitor coupling the other end of said one resistor to said transformer.

References Cited in the file of this patent

UNITED STATES PATENTS

| | | |
|---|---|---|
| 1,845,151 | Hubbard | Feb. 16, 1932 |
| 2,019,352 | Livingston | Oct. 29, 1935 |
| 2,157,977 | Alreq | May 9, 1939 |
| 2,475,063 | Thalner | July 5, 1949 |
| 2,555,449 | Kucharski | June 5, 1951 |
| 2,565,621 | Olson | Aug. 28, 1951 |
| 2,573,280 | Schmidt | Oct. 30, 1951 |
| 2,591,942 | Janssen | Apr. 8, 1952 |